United States Patent [19]

McVittie

[11] 3,941,468
[45] Mar. 2, 1976

[54] IDENTIFICATION STRUCTURE, MEANS FOR, AND METHOD OF PRODUCTION

[75] Inventor: Thomas J. McVittie, Bloomfield Hills, Mich.

[73] Assignee: Marlin & Company Systems Engineers Inc., Clawson, Mich.

[22] Filed: Sept. 18, 1973

[21] Appl. No.: 398,424

Related U.S. Application Data

[63] Continuation-in-part of Ser. No. 150,381, June 7, 1971.

[52] U.S. Cl. .................................. 355/3 R; 355/10
[51] Int. Cl.² .......................................... G03G 15/00
[58] Field of Search .......... 355/3, 4, 5, 10; 354/105, 354/109, 83, 488

[56] References Cited
UNITED STATES PATENTS

| | | | |
|---|---|---|---|
| 3,395,629 | 8/1968 | Salyesen | 354/109 |
| 3,673,936 | 7/1972 | Stone | 355/5 |
| 3,679,301 | 7/1972 | Inoue | 355/4 |
| 3,712,733 | 1/1973 | Giaimo | 355/4 |

*Primary Examiner*—John M. Horan
*Attorney, Agent, or Firm*—Whittemore, Hulbert & Belknap

[57] ABSTRACT

A self-destructing identification card including electrostatically deposited identification data sandwiched between two halves of a fold-over plastic card, the two halves of which are cohered to each other by a cold solvent cement, and the method of and apparatus for manufacturing the card including a television camera for taking a picture to be imprinted on the card and a cathode ray tube for providing a negative image on a freeze frame basis for imprinting on a sensitized portion of the identification card during manufacture thereof.

3 Claims, 5 Drawing Figures

U.S. Patent    March 2, 1976    Sheet 1 of 2    3,941,468
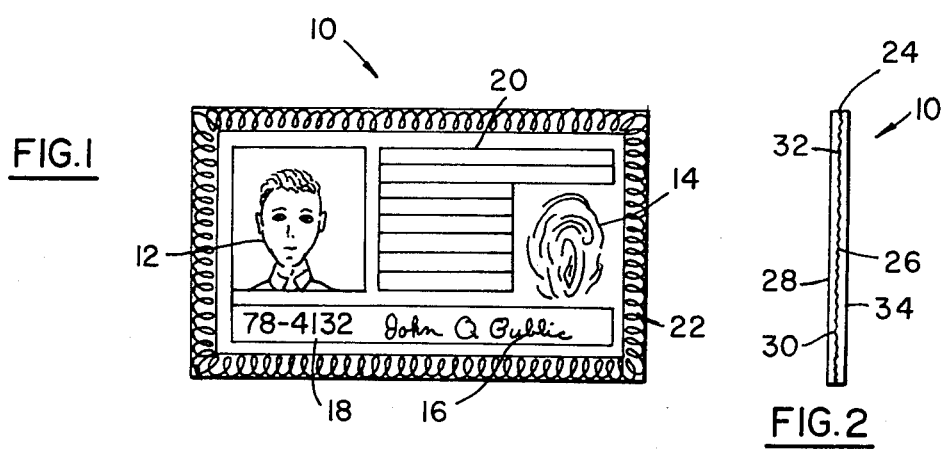
FIG.1
FIG.2
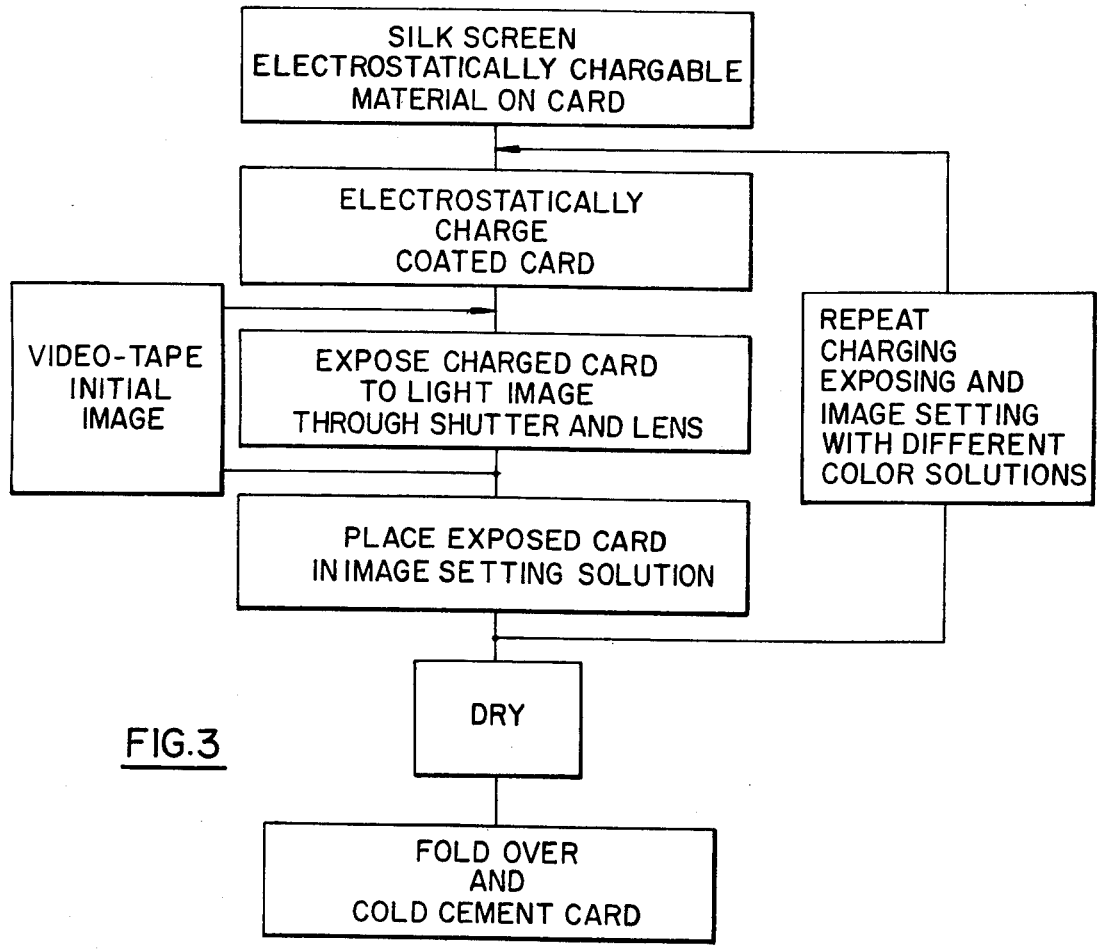
FIG.3

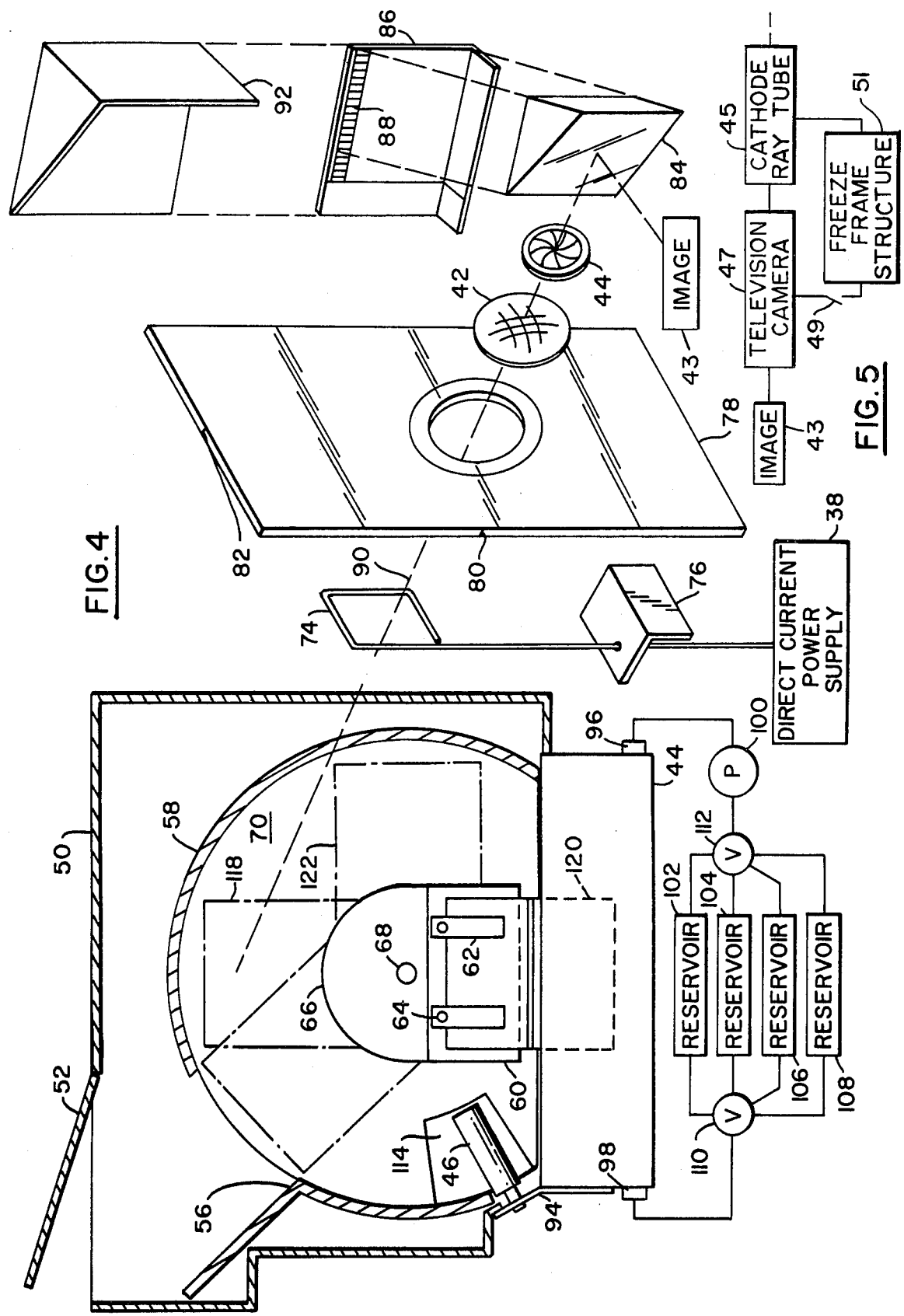

IDENTIFICATION STRUCTURE, MEANS FOR, AND METHOD OF PRODUCTION

CROSS REFERENCE TO RELATED APPLICATIONS

This application is a Continuation-in-Part of application Ser. No. 150,381, filed June 7, 1971.

BACKGROUND OF THE INVENTION

1. Field of the Invention

The invention relates to identification structure such as credit cards, driver's license and identification cards for industry, schools and the like, and a method of amd structure for manufacturing of such structure. Such identification structure now desirably includes a photograph, possibly a fingerprint and a signature, together with desired information about the individual whose picture, signature and fingerprint are on the card.

2. Description of the Prior Art

In the past, identification cards have often not included specific identification means such as pictures, thumbprints and the like since construction of the identification cards with such information thereon has been expensive. The construction of such cards in the past has required the taking of a separate picture and/or separate thumbprint and the inclusion of the picture and fingerprint between two separated cards which are then sealed usually about their periphery by heat sealing apparatus.

Such prior structure has not produced tamper-proof credit and identification cards. For example, with such structure it is not difficult to open the heat seal adjacent the photograph, usually positioned in a pocket in one of the cards heat sealed together, remove the photograph and substitute another photograph therefor.

SUMMARY OF THE INVENTION

In accordance with the present invention, a plastic identification card is produced which may include a picture, a thumbprint and a signature, all of which may be electrostatically deposited on one half of a foldover, clear plastic sheet, the other half of which is clear and includes a cold-setting solvent cement thereon. The electrostatic images are then sealed between the two halves of the plastic sheet on folding the sheet to provide a sandwich construction in which the engaged surfaces are secured together so that any attempt to separate the engaged surfaces will destroy the electrostatically deposited images, whereby the card is substantially tamper-proof.

The card is produced by coating one half of the plastic sheet with zinc oxide in any predetermined pattern, charging the coated portion of the card electrostatically in a dark enclosure, exposing the coated, electrostatically charged portion of the card to a light image it is desired to provide on the coated portion of the card, and passing the coated and exposed portion of the card through an image-setting solution of particles charged oppositely to the electrostatically charged, coated portion of the card whereby the particles adhere to the electrostatically charged surface of the card in accordance with the charge thereon to set the desired image on the card, and drying the resulting card.

The light image may be directly from an object to be copied through a mirror image reflection and a photographic lens, or alternatively may be from a television camera picture on a cathode ray tube on a freeze frame basis with a negative image through a photographic lens.

Multiple charging and placing of images on different portions of the card is possible. Also, multiple charging with repeated placing of identical images on the same portion of the card subsequently passed through different image-setting solutions which provide colored images may be effected.

BRIEF DESCRIPTION OF THE DRAWINGS

FIG. 1 is a plan view of an identification card constructed in accordance with the invention.

FIG. 2 is a section view of the identification card illustrated in FIG. 1, taken substantially along the line 2—2 in FIG. 1.

FIG. 3 is a block diagram illustrating the method of producing the identification card illustrated in FIG. 1.

FIG. 4 is a diagrammatic representation of camera structure for producing the identification card illustrated in FIG. 1.

FIG. 5 is a block diagram of alternate light image producing structure for use with the camera structure of FIG. 4.

DESCRIPTION OF THE PREFERRED EMBODIMENT

In accordance with one embodiment of the invention, an identification card 10 illustrated best in FIG. 1 is produced with a picture 12, a thumbprint 14 and a signature 16 thereon, together with other required identification data such as code numbers 18 and typed material 20 thereon. The picture 12, thumbprint 14, signature 16 and any other desired material such as the distinctive artistic border 22 is produced by electrostatic deposition of charged particles on a portion of the card 10.

The card 10, which may be made of Teflon or other clear plastic, may be of any desired dimension and as shown best in FIG. 2 is provided with a central fold line 24. The picture, thumbprint, signature and the other identification data are placed on the surface 26 of one portion 28 of the card 10. A cold solvent cement 30 is placed on the surface 32 of the portion 34 of the card 10, and the card is folded about the fold line 24 so that the surface 32 is secured to the surface 26 by cohesion.

The card 10 thus produced requires no heat sealing, no separate photographic film, and is self-destructing when an attempt is made to tamper with the identification data. Thus, the photograph and thumbprint will be destroyed if the surfaces 26 and 32 are pulled apart due to this identification data being electrostatically deposited, so that part of it will be retained on each surface 26 and 32 on their being pulled apart.

In producing the cards 10, the areas on which electrostatic deposition is desired are first coated with a material which is capable of taking a uniform electrostatic charge. Thus, the surface may preferably be coated with powdered zinc oxide in a lacquer thinner vehicle. Powdered iron oxide and selenium may also be used, if desired. Powdered zinc oxide may be obtained from the American Zinc Company in St. Louis, Missouri, under their designation Azeofax-661. Any lacquer thinner which is a weak solvent for the clear Teflon material of which the card 10 is made and which will evaporate readily may be used to carry the powdered zinc oxide.

In production, the zinc oxide in the lacquer thinner vehicle is silkscreened on a flat plastic sheet. The silkscreen will normally contain several card templates thereon, whereby the zinc oxide will be applied on a large, clear Teflon sheet over desired areas on a number of cards 10 with a single screening. The large plastic sheet will normally be held flat on a vacuum table while the zinc oxide is silkscreened thereon, and after the lacquer thinner has evaporated leaving the zinc oxide in the surface of the Teflon where desired due to the solvent action of the lacquer thinner, the large plastic sheet will be cut into small plastic sheets which are twice the size of the card 10 illustrated in FIG. 1.

As indicated previously, only the surface 26 on one side of the fold line 24 of the card 10 will have the zinc oxide deposited thereon. The other portion 34 of the card 10 will have the surface 30 thereof coated with a cold solvent cement such as the pressure sensitive solvent cement SC 4302-9 obtainable from the H. B. Fuller Company of Detroit, Michigan. As previously indicated, the cement has solvent properties with regard to the Teflon so that when the cement is placed on the Teflon, it tends to soften the surface of the Teflon.

Prior to use of the cards 10 and before they are folded along the fold line 24, the cement is covered with a waxed kraft paper which may be obtained from Beecher, Peck and Lewis of Detroit, Michigan. The kraft paper may be stripped off of the surface 30 having the cement 32 thereon over which it is applied just prior to use of the cards. The kraft paper prevents premature drying of the cement.

In the production of the cards 10, the cards coated in desired areas are delivered to a station at which it is desired to identify individuals and at which the camera structure 36 illustrated in FIG. 4 is located.

An individual to be identified is required to place his thumb on the coated zinc oxide surface in the position of the print 14 after the desired information 18 and 20 has been typed or otherwise placed on the card 10. The card 10 is then placed in the camera structure 36.

The coated areas such as the area of the picture 12 are electrostatically charged positive from power source 38. A positive subject image is directed onto the coated, charged area 12 from the front mirrored prism 40 through the lens 42 and shutter 44, and the portion 24 of the card 10 is passed through a tank 46 of image-setting solution, after which the card is dried by the roller 48 and removed from the camera.

Alternatively the subject image may be directed onto the coated, charged area through a lens 42 and shutter 44 from a cathode ray tube 45 displaying a frozen frame from a television camera 47 directed on the image. Also, the image-setting solution can be washed over the film instead of passing the film through the image-setting solution.

The person to be identified places his signature 16 on the card 10. The kraft paper is then stripped from the portion 34 of the card 10, and the card is folded about the fold line 24 so that the clear plastic portion 34 provides a cover over the electrostatically deposited picture 12 and fingerprint 14 and the rest of the identification material on the surface 26 of the portion 28 of the card.

In more detail, the camera structure 36 includes an outer lighttight box 50 in which an individual coated card 10 is positioned through the door 52. The portion 34 of the card 10 having the solvent cement 32 thereon and protected by waxed kraft paper placed thereover is inserted into the camera structure 36 through the door 52 in the lighttight box 50 and through the opening 56 in the cylindrical inner case 58 into the yoke 60 for rotation into and out of a plurality of stations.

The yoke 60 as shown is U-shaped and is adapted to exactly receive the portion 34 of the card 10. The portion 34 of the card 10 is held in the yoke 60 by the spring retainer clips 62 secured to the yoke 60 by convenient means such as screws 64. The yoke 60 is secured to a plate 66 which is rotatable through 360° about an axle 68 journaled in end plate 70 of the cylindrical inner case 58.

Rotation of the plate 66 and therefore the card 10 positioned within the yoke 60 may be by a manual crank secured to the axle 68 or may be by more sophisticated timing and driving structure which are easily within the skill of the art to provide.

The power source 38 may be contained in the lighttight box 50 or may be connected thereto, as will be understood by those in the art. The power source 38 may be an 8,000-volt direct current power source having an amperage of, for example, 6 amps. Charging of the zinc oxide coated portions of the card 10 is from the antenna 74 electrostatically, due to the well-known corona effect when the power source 38 is turned on and connected to the antenna 74 with the antenna 74 adjacent the portion 28 of the card 10. In the present case, the zinc oxide is negatively charged by the negative power source.

The camera 36 as shown in FIG. 4 further includes the movable plate 78 having the lens 42 and shutter 44 secured thereto as shown. The plate 78 is provided with the marks 80 and 82 thereon which in conjunction with a vernier scale on the lighttight box 50 are used to position the plate 78 relative to a card 10 held in the yoke 60 so that a light image directed through the lens on opening of the shutter will strike the desired coated and charged portion of the card 10.

The shutter may be a simple shutter having, for example, a 1.4f opening. The lens may be a relatively simple acromatic lens in the example shown where colored images are desired. If only black and white images are desired, the lens may be a simple double convex lens. In either case, the focal length of the lens will be approximately three feet. The lens 42 and shutter 44 are secured to the plate 78 in spaced apart aligned relation by convenient means, again well known in the photographic art.

A front mirrored prism 84 is positioned over the lens 42 as shown and is movable with respect thereto over the supporting bracket 86 therefor. Bracket 86 may be secured to the plate 78 or to the mounting frame for the lens 42 and shutter 44 as desired. The prism 84 may be adjusted relative to the vernier scale 88 to provide an exact focus of an image directed thereto on the desired portion of the card 10 along the path 90 shown in FIG. 4. A protecting screen 92 is provided for the prism 84.

It will be understood that a single mirror positioned in the place of the mirrored front surface of the prism 84 may be substituted for the prism 84, if desired, to provide a positive image on the card 10 from a positive subject. In either case, no negative is required in the present process since a positive print is prepared directly from a positive subject.

Alternatively the mirror or mirrored surface prism 84 may be done away with entirely and the image 43 may be recorded on a television camera 47 as shown in FIG. 5. With the equipment shown in FIG. 5, the image is reproduced on the cathode ray tube 45 as a negative from the camera 47. When the image is as desired, as may be determined from a positive cathode ray tube monitor (not shown), the switch 49 is closed to freeze a single frame image on the cathode ray tube. The single frame negative image is then passed directly through shutter 44 and lens 42 to card 10 as a positive image on card 10.

All of the television camera 47 and cathode ray tube 45 having freeze frame structure 51 associated therewith are available as off-the-shelf items of commerce and will not be considered in detail herein. The image 43 may be anything such as a person's head, fingerprint, or signature.

The tank 44 for the image-setting solution again may be positioned within the lighttight box 50 or form a portion of the lighttight box 50 and supports the roller 46 on the bracket 94. An input coupling 96 and an output coupling 98 are provided on the tank 44 which are connected by means of hoses, as shown, to a reservoir 102 of an image-setting solution and a pump 100 for pumping the image-setting solution through the tank 44.

Wherein a black and white image is desired on the card 10, the image-setting solution may be powdered graphite suspended in alcohol. The powdered graphite has a known affinity for the negatively charged zinc oxide portions of the card 10 and will be attracted thereto in accordance with the charge thereon. The amount of powdered graphite attracted to the zinc oxide coating of the card will determine how dark the particular portion of the image is so that the tones in the image will be dependent upon the degree of charge of particular portions of the card, in accordance with known electrostatic reproduction methods.

If multiple color images are desired on the card 10, separate tanks 44 must be provided through which the charged portion of the card 10 is moved or, as in the present instance and as shown in FIG. 4, the image-setting solution in the tank 44 is changed for each different color by emptying the tank 44 of one image-setting solution and filling the tank 44 with another image-setting solution between separate charging and exposing of the desired portions of the card 10 and subsequent movement thereof through the tank 44.

Such a system is schematically illustrated by the pump 100, reservoirs 102, 104, 106 and 108 of different image-setting solutions and the directing valves 110 and 112. The valves 110 and 112 may, of course, be manually operated or, in a more sophisticated camera structure 36, will be automatically actuated and timed along with pump 100.

Appropriate additional colors such as yellow, red and blue which in combination may be used with black to produce most desired colors may be provided by image-setting of powdered molybdenum metaphosphate, cobalt ferricyanide and cupric oxide suspended in alcohol.

The roller 46 for drying the portion 28 of the card 10 after it has been moved through the image-setting solution in the tank 44 is a polyurethane roller and acts to squeeze the excess alcohol from the portion 28 of the card 10 on its removal from the tank 44 against a drying plate 114 mounted on the end plate 70 of the cylindrical inner case 58.

In overall operation of the camera structure 36, a card 10 which has been coated with zinc oxide in the desired areas of the portion 28 thereof and which has not yet been folded about the fold line 24 but with the cement 32 on the portion 34 covered with kraft paper is signed by the subject with a zinc oxide ink solution and inserted through the opening 56 in the inner case 58 through the open door 52 of the lighttight outer case 50 of the camera 36. The portion 34 of the card 10 is held in yoke 60 by means of the retaining springs 62, and the plate 66 is rotated from the receiving station 116 illustrated in phantom to the charging and image-producing or exposing vertical station 118, again illustrated in phantom.

With the portion 28 of the card 10 at the position 118, and with the cover 52 of the lighttight box 50 closed, the zinc oxide coating on the card 10 is charged with a negative electrostatic charge by turning on the power source 38 due to the juxtaposition of the antenna 74 and the well-known corona effect of the high-voltage direct current electrical energy from the power source 38 on the antenna 74. The charge will be positioned substantially uniformly over the zinc oxide coated portion of the card 10.

The subject is then positioned at right angles to the lens 42 so that a positive light image of the subject strikes the mirrored front surface of the prism 84 and is directed toward the card 10. The plate 78 is then adjusted vertically and/or horizontally to correctly position the image on the prism 84 on the card 10. The prism 84 is adjusted to form the image. With the plate 78 and prism 84 correctly positioned, the shutter 44 is opened and closed in the usual manner to permit a light image of the subject to pass through the lens 42.

The light image passing through the lens 42 will impinge on the desired portion of the card 10 and discharge the zinc oxide coating on the card 10 in accordance with the amount of light impinging on a particular area of the card. An electrostatic image of the subject is thus placed on the portion 28 of the card 10.

The portion 28 of the card 10 attached to plate 66 is then rotated through the tank 44 into which an image-setting solution of graphite and alcohol has been pumped. The fine graphite particles are attracted to the negatively charged zinc oxide surface in proportion to the charge on the surface so that a positive reproduction of the subject is provided on the desired portion of the card 10.

The card 10 is then rotated beneath the roller 46 so that the card is dried after which the plate 66 is rotated into the initial position 116. The card 10 with the image fixed thereon may then be withdrawn through the opening 56 in the cylindrical inner case 58 with the door 52 of the lighttight case 50 open.

It will be understood that if it is desired to print the fingerprint 14 illustrated in FIG. 1, that the light image exposure step may be dispensed with since the body oil placed on the zinc oxide coating of the card 10 will in itself inhibit the collection of graphite on the card 10 so that on movement of the card 10 through the image-setting solution in the tank 44 the fingerprint will be visibly set out.

In addition, it will be understood that if it is desired for example to place two photographs on a single identification card at different times, a portion of the card 10 where the second photograph is to be placed later may be masked before the card 10 is placed in the camera 36 so that at least one of the charging, exposure and image-fixing steps are not performed on that portion of the card. After the first image has been placed on the card as by the procedure outlined above, the mask may be taken from the masked portion of the card and the card recycled at a later date to place the second image on the same card with the first image being masked.

If, during the exposure of the coated and charged portion of the card 10, the subject moves, sneezes or otherwise presents an undesirable image, with the present system it is not necessary to destroy the card 10. In such case, the door 52 is merely opened to expose the entire coated portion of the card 10 whereby the charge on the zinc oxide portion will be completely dissipated. The door 52 is then closed and the charging and exposing of the coated portion of the card 10 is repeated as above.

When it is desired to produce colored images as for example colored photographs on an identification card during the initial exposure of the charged portion of the card 10, a video tape recording of the image impressed on the card 10 is taken at the station 118 in the camera structure 36 and after the image is first passed through the tank 44 so that a single color image is set on the desired portion of the card 10 and the card is dried through the roller 46, the card is again returned to the charging and exposure position 118 where the zinc oxide on the desired portion of the card is again charged from the power source 38, after which the card 10 is rotated into the multiple exposure station 122 and the same light image is again directed toward the same portion of the card 10 by a replay of the video tape image.

While the recharging and reexposure of the card is taking place, the first colored image-setting solution is pumped out of the tank 44 into its reservoir 104, 106 or 108 and a second colored image-setting solution for setting an image with a different color is placed in the tank 44. The card 10 is then recycled into the tank 44 and past the roller 46. This procedure may be repeated as many times as necessary to provide the desired color in the appropriate positions on the card 10.

Alternatively it will be understood that if desired the card 10 could be maintained in one position while the card is charged, exposed and the image-setting solution is flushed over the card. The drying of the card could readily be accomplished with the card 10 in the same fixed position. Perfect registry would thus be accomplished for production of colored images.

It will be particularly noted that in the above processes no negative is required and the cards 10 prior to being charged in the camera structure 36 may be handled in light without damage. Thus, the usual film handling precautions may be dispensed with on use of cards 10.

In any case, after the card has been imprinted with the required images, either black or white or colored as desired, the card 10 is removed from the camera 36 through the opening 56 and the door 52 and the kraft paper is stripped from the clear plastic portion 34 of the card 10 to expose the cold solvent cement 32, and the card is folded along the fold line 24 to form a sandwich constructed as illustrated best in FIG. 2 wherein the image 12, fingerprint 14 and signature 16 are protected by the clear plastic portion 34.

Further, as indicated above, should anyone try to tamper with the identification data on the card 10 after it has been folded and sealed, the identification data would self-destruct on pulling the portions 28 and 34 of the card 10 apart due to the coherence of the portions 28 and 34 of the card 10 and the fusing of the electrostatic particles of the identification data onto both surfaces 26 and 32 of the portions 28 and 34 of the card 10.

While one embodiment of the invention has been considered in detail, it will be understood that other embodiments and modifications are contemplated by the inventor. Thus, the power source may be a positive power source with the coating on the cards of the type that will receive a positive charge, in which case the image-setting solutions will have particles with an affinity for positively charged particles therein. Any ink may be used to place the signature on a zinc oxide coated portion of the card since the zinc oxide will be partly on both surfaces 26 and 30 of the card on separating portions 28 and 34 and the signature will be destroyed. Also, the particular camera structure may be considerably more refined than illustrated diagrammatically in FIG. 4. Further, it will be understood that the electrostatic methods disclosed herein may be used to provide excellent printing plates so that the invention, while having particular advantages in the identification field, is not limited thereto. It is therefore the intention to include within the scope of the invention all modifications and embodiments thereof as are defined by the appended claims.

What I claim as my invention is:

1. Structure for producing identification cards or the like having electrostatically deposited images thereon including means for receiving an identification card and for rotating the card in a vertically oriented circle, means operably associated with the means for receiving and rotating the card for electrostatically charging the card adjacent the top of the vertically oriented circle, means for producing an electrostatic image on the charged card, means carrying an image-setting solution including particles therein having an affinity for the charged card positioned to receive the charged card having the electrostatic image thereon at the bottom of the vertically oriented circle through which the card is moved, means for passing image-setting solution over the card at the lowermost portion of the circle and means for subsequently drying the card on movement of the card toward the position in which it was received.

2. Structure as set forth in claim 1 wherein the means for producing an electrostatic image on the card comprises a camera lens and shutter a television camera for taking a picture of the image, and a cathode ray tube connected to the television camera for producing a negative light image on the cathode ray tube of the picture taken by the television camera and projecting it through the shutter and lens onto the charged card.

3. Structure as set forth in claim 2 and further including freeze frame structure connected to the television camera and cathode ray tube, and switch means operably associated with the freeze frame structure to hold a picture on the cathode ray tube on actuation of the switch means.

* * * * *